(12) United States Patent
Ricketts

(10) Patent No.: US 12,015,295 B2
(45) Date of Patent: *Jun. 18, 2024

(54) MOBILE GENERATOR CHARGING SYSTEM AND METHOD

(71) Applicant: Fluidity Power LLC, Sausalito, CA (US)

(72) Inventor: Jeffrey James Ricketts, Humaco, PR (US)

(73) Assignee: Der-X Energy LLC, San Juan, PR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,897

(22) Filed: Mar. 3, 2023

(65) Prior Publication Data

US 2023/0344254 A1    Oct. 26, 2023

Related U.S. Application Data

(63) Continuation of application No. 17/950,701, filed on Sep. 22, 2022.
(Continued)

(51) Int. Cl.
*H02J 7/00* (2006.01)
*B60L 53/53* (2019.01)
(Continued)

(52) U.S. Cl.
CPC ............ *H02J 7/0048* (2020.01); *B60L 53/53* (2019.02); *B60L 53/62* (2019.02); *B60L 55/00* (2019.02);
(Continued)

(58) Field of Classification Search
CPC .. H02J 7/0048; H02J 7/00036; H02J 7/00712; H02J 7/342; B60L 53/53; B60L 53/62; B60L 55/00
(Continued)

(56) References Cited

U.S. PATENT DOCUMENTS 5,578,915 A * 11/1996 Crouch, Jr. ........... H02J 7/0013
324/426
5,844,342 A * 12/1998 Miyatani ............... B60W 20/40
903/905

(Continued)

OTHER PUBLICATIONS

Non-Final Office Action dated Dec. 5, 2022, issued in U.S. Appl. No. 17/950,701; 11 pages.
(Continued)

*Primary Examiner* — John T Trischler
(74) *Attorney, Agent, or Firm* — Fresh IP PLC; John R. Bednarz

(57) ABSTRACT

A system includes a first charger connected to one of an aircraft, a watercraft, and a vehicle having at least one vehicle battery, a second charger connected to an on board battery pack, and at least one programmable logic controller (PLC) to manage communication between the at least one vehicle battery and the first charger to ensure that the at least one vehicle battery reaches a preset state of charge (SOC), manage communication between the on board battery pack and the second charger to ensure that the on board battery pack reaches the preset SOC, and manage transfer of energy from the on board battery pack to the at least one vehicle battery.

16 Claims, 6 Drawing Sheets

Related U.S. Application Data

(60) Provisional application No. 63/247,586, filed on Sep. 23, 2021.

(51) Int. Cl.
*B60L 53/62* (2019.01)
*B60L 55/00* (2019.01)
*H02J 3/32* (2006.01)
*H02J 7/34* (2006.01)

(52) U.S. Cl.
CPC .......... *H02J 3/322* (2020.01); *H02J 7/00036* (2020.01); *H02J 7/00712* (2020.01); *H02J 7/342* (2020.01); *B60L 2210/30* (2013.01); *Y02T 90/14* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 6,051,809 A * | 4/2000 | Colella | B23K 9/32 | 219/133 |
| 6,285,162 B1 * | 9/2001 | Koo | H02J 7/00712 | 320/132 |
| 6,660,967 B2 * | 12/2003 | Brofft | F02B 63/06 | 219/133 |
| 6,670,580 B2 * | 12/2003 | Brofft | B23K 9/1006 | 290/1 R |
| 6,671,585 B2 * | 12/2003 | Lof | F03D 9/257 | 705/37 |
| 6,924,621 B2 * | 8/2005 | Jabaji | H02J 7/0031 | 320/117 |
| 6,994,560 B2 * | 2/2006 | Kohchi | H01R 13/7036 | 439/43 |
| 7,224,132 B2 * | 5/2007 | Cho | B60L 50/62 | 290/9 |
| 7,560,907 B2 * | 7/2009 | Nelson | H02J 15/00 | 320/148 |
| 7,615,883 B2 * | 11/2009 | Meheen | F03D 5/02 | 290/55 |
| 8,019,483 B2 * | 9/2011 | Keefe | B60L 53/63 | 700/286 |
| 8,067,848 B1 * | 11/2011 | Vilsaint | B62J 6/06 | 290/1 R |
| 8,373,289 B2 * | 2/2013 | Hunter | H01M 8/2475 | 290/1 A |
| 8,441,227 B2 * | 5/2013 | Choi | H04M 1/0262 | 320/101 |
| 8,441,228 B2 * | 5/2013 | Brabec | H02J 7/342 | 180/65.21 |
| 8,487,637 B2 * | 7/2013 | Werle | G01R 31/58 | 324/555 |
| 8,502,543 B2 * | 8/2013 | Steiger | G01R 31/2805 | 324/537 |
| 8,872,379 B2 * | 10/2014 | Ruiz | B60L 1/003 | 307/66 |
| 8,909,399 B2 * | 12/2014 | Kato | B60L 15/2045 | 180/65.265 |
| 9,083,194 B2 * | 7/2015 | Koga | H02J 7/342 | |
| 9,145,082 B2 * | 9/2015 | Hindle | B60P 3/00 | |
| 9,260,030 B2 * | 2/2016 | Falk | B60L 55/00 | |
| 9,331,484 B2 * | 5/2016 | Yonetani | H02J 7/007194 | |
| 9,630,511 B2 * | 4/2017 | Higashi | B60L 53/67 | |
| 9,754,300 B2 * | 9/2017 | Kempton | B60L 53/65 | |
| 9,828,050 B2 * | 11/2017 | Hindle | B62D 63/06 | |
| 9,966,769 B2 * | 5/2018 | Srinivasan | H01M 10/482 | |
| 9,987,940 B2 * | 6/2018 | Uyeki | B60L 53/30 | |
| 10,023,062 B2 | 7/2018 | Kang | | |
| 10,150,358 B2 * | 12/2018 | Soto | B60K 6/48 | |
| 10,164,433 B2 * | 12/2018 | Miller | H02J 13/00022 | |
| 10,224,579 B2 * | 3/2019 | Christensen | H01M 10/4257 | |
| 10,232,719 B2 * | 3/2019 | Tajima | H02J 3/322 | |
| 10,245,972 B2 * | 4/2019 | Healy | B60L 8/003 | |
| 10,406,927 B2 | 9/2019 | Baba | | |
| 10,414,283 B2 * | 9/2019 | Kudo | H02J 3/008 | |
| 10,538,166 B2 * | 1/2020 | Ito | B60L 53/51 | |
| 10,543,750 B2 | 1/2020 | Ota et al. | | |
| 10,752,128 B1 * | 8/2020 | Langton | B60L 58/16 | |
| 10,773,602 B2 * | 9/2020 | Caliskan | B60K 8/00 | |
| 10,800,279 B2 * | 10/2020 | Bhat | B60L 53/14 | |
| 10,821,853 B2 * | 11/2020 | Healy | B60L 1/003 | |
| 10,886,575 B2 * | 1/2021 | Christensen | H02J 7/007194 | |
| 10,913,371 B2 | 2/2021 | Baba | | |
| 10,988,998 B2 * | 4/2021 | Fischer | H02B 1/52 | |
| 11,035,214 B2 * | 6/2021 | Cui | H02K 11/049 | |
| 11,142,972 B1 * | 10/2021 | Fischer | H02B 5/00 | |
| 11,173,804 B2 * | 11/2021 | Tsubokura | B60L 55/00 | |
| 11,183,917 B1 * | 11/2021 | Li | H02M 1/10 | |
| 11,196,096 B2 * | 12/2021 | Song | H01M 10/441 | |
| 11,203,262 B2 * | 12/2021 | Schumacher | H02J 7/35 | |
| 11,274,512 B2 * | 3/2022 | Fischer | E21B 43/2605 | |
| 11,325,498 B2 * | 5/2022 | Healy | B60L 50/40 | |
| 11,332,030 B2 * | 5/2022 | Nishio | B60L 53/67 | |
| 11,427,103 B2 * | 8/2022 | Brombach | H02J 7/00 | |
| 11,434,709 B2 * | 9/2022 | Fischer | H02P 27/04 | |
| 11,448,189 B2 * | 9/2022 | Dietzel | F03D 9/32 | |
| 11,456,612 B2 * | 9/2022 | Ozaki | B60L 53/57 | |
| 11,479,144 B2 * | 10/2022 | Healy | B60K 6/448 | |
| 11,491,883 B2 | 11/2022 | Khaligh et al. | | |
| 11,492,887 B2 * | 11/2022 | Cui | H02K 11/049 | |
| 11,498,448 B2 | 11/2022 | Van De Water | | |
| 11,505,030 B2 * | 11/2022 | Healy | B60H 1/03 | |
| 11,560,764 B2 * | 1/2023 | Fischer | E21B 43/2607 | |
| 11,739,602 B2 * | 8/2023 | Fischer | F04D 13/068 | 166/308.1 |
| 11,766,951 B2 * | 9/2023 | Healy | B60K 6/448 | 701/22 |
| 2002/0084655 A1 * | 7/2002 | Lof | F03D 7/048 | 290/44 |
| 2002/0163196 A1 * | 11/2002 | Brofft | F02B 63/04 | 290/1 A |
| 2003/0006613 A1 * | 1/2003 | Lof | G06Q 40/04 | 290/44 |
| 2003/0042237 A1 * | 3/2003 | Brofft | F02B 63/06 | 219/133 |
| 2003/0210014 A1 * | 11/2003 | Jabaji | H02J 7/007182 | 320/104 |
| 2005/0136726 A1 * | 6/2005 | Kohchi | B60L 53/16 | 439/352 |
| 2008/0067974 A1 * | 3/2008 | Zhang | B60L 53/63 | 903/907 |
| 2008/0174174 A1 * | 7/2008 | Burns | B60L 7/14 | 303/152 |
| 2008/0303287 A1 * | 12/2008 | Meheen | H02S 10/12 | 290/55 |
| 2009/0210357 A1 * | 8/2009 | Pudar | B60L 53/65 | 705/412 |
| 2010/0017045 A1 * | 1/2010 | Nesler | B60L 53/665 | 700/295 |
| 2010/0079004 A1 * | 4/2010 | Keefe | B60L 53/63 | 307/80 |
| 2010/0230414 A1 * | 9/2010 | Hunter | H01M 8/2475 | 220/553 |
| 2011/0087395 A1 * | 4/2011 | Yamamoto | B60W 10/26 | 701/22 |
| 2011/0109259 A1 * | 5/2011 | Choi | H04M 1/0262 | 320/101 |
| 2011/0109319 A1 * | 5/2011 | Steiger | G01R 31/2805 | 324/537 |
| 2011/0133754 A1 * | 6/2011 | Werle | G01R 31/2805 | 324/555 |
| 2011/0202217 A1 * | 8/2011 | Kempton | B60L 53/305 | 320/109 |
| 2011/0204720 A1 * | 8/2011 | Ruiz | B60L 53/305 | 307/66 |
| 2011/0246259 A1 * | 10/2011 | Hostyn | H02J 3/008 | 705/412 |

(56) References Cited

U.S. PATENT DOCUMENTS

| | | | | |
|---|---|---|---|---|
| 2011/0316474 | A1* | 12/2011 | Kimura | H02J 7/0042 320/107 |
| 2012/0049794 | A1* | 3/2012 | Han | B60L 58/26 320/109 |
| 2012/0072066 | A1* | 3/2012 | Kato | B60W 20/00 180/65.265 |
| 2013/0020993 | A1* | 1/2013 | Taddeo | B60L 53/65 320/109 |
| 2013/0033230 | A1* | 2/2013 | Falk | B60L 55/00 320/109 |
| 2013/0049458 | A1* | 2/2013 | Koga | B60L 58/20 307/9.1 |
| 2013/0049676 | A1* | 2/2013 | Ishikawa | B60L 53/53 320/103 |
| 2013/0175819 | A1* | 7/2013 | Hindle | B60L 3/00 296/24.3 |
| 2013/0179135 | A1 | 7/2013 | Kang | |
| 2014/0312841 | A1 | 10/2014 | Baba | |
| 2015/0054460 | A1 | 2/2015 | Epstein et al. | |
| 2015/0255985 | A1* | 9/2015 | Higashi | H02J 3/322 700/297 |
| 2015/0256002 | A1* | 9/2015 | Yonetani | H02J 7/0069 320/150 |
| 2015/0266391 | A1* | 9/2015 | Hostyn | H02J 3/32 701/423 |
| 2016/0075247 | A1* | 3/2016 | Uyeki | H02J 3/00 455/456.3 |
| 2016/0090054 | A1* | 3/2016 | Powell | B60H 1/00428 307/9.1 |
| 2016/0107710 | A1* | 4/2016 | Hindle | B60P 3/00 307/9.1 |
| 2016/0339789 | A1* | 11/2016 | Wang | B64F 1/007 |
| 2017/0149256 | A1* | 5/2017 | Srinivasan | H02J 7/00712 |
| 2017/0174067 | A1* | 6/2017 | Soto | B60K 15/10 |
| 2017/0174092 | A1* | 6/2017 | Köhnke | H02J 5/00 |
| 2017/0194669 | A1* | 7/2017 | Christensen | H01M 10/615 |
| 2017/0207626 | A1* | 7/2017 | Miller | H02J 3/322 |
| 2017/0282733 | A1* | 10/2017 | Ito | B60L 53/38 |
| 2017/0358041 | A1* | 12/2017 | Forbes, Jr. | G05D 3/12 |
| 2017/0361718 | A1* | 12/2017 | King | B60L 53/24 |
| 2018/0086227 | A1* | 3/2018 | Healy | B60L 15/2018 |
| 2018/0086402 | A1* | 3/2018 | Hindle | B60H 1/246 |
| 2018/0093655 | A1* | 4/2018 | Healy | B60K 6/40 |
| 2018/0154778 | A1 | 6/2018 | Ota et al. | |
| 2018/0186246 | A1* | 7/2018 | Kudo | B60L 55/00 |
| 2018/0290561 | A1* | 10/2018 | Baumgärtner | H02J 7/342 |
| 2019/0070944 | A1* | 3/2019 | Soto | B60K 6/48 |
| 2019/0089018 | A1* | 3/2019 | Christensen | H02J 7/007194 |
| 2019/0241089 | A1* | 8/2019 | Heyne | B60L 53/31 |
| 2019/0329657 | A1* | 10/2019 | Caliskan | B60K 8/00 |
| 2019/0337392 | A1* | 11/2019 | Joshi | H01M 10/44 |
| 2019/0366871 | A1 | 12/2019 | Baba | |
| 2019/0375306 | A1* | 12/2019 | Ambrosetti | B60L 53/30 |
| 2020/0086747 | A1* | 3/2020 | Bhat | B60L 53/67 |
| 2020/0086754 | A1* | 3/2020 | Hou | H02J 7/0042 |
| 2020/0130527 | A1* | 4/2020 | Brombach | B60L 53/63 |
| 2020/0200147 | A1* | 6/2020 | Dietzel | B63H 20/007 |
| 2020/0233410 | A1* | 7/2020 | Burns | B60L 50/66 |
| 2020/0263528 | A1* | 8/2020 | Fischer | F04B 17/03 |
| 2020/0307402 | A1* | 10/2020 | Poilasne | H02J 3/322 |
| 2020/0321797 | A1* | 10/2020 | Gerrits | B60L 53/52 |
| 2020/0335835 | A1* | 10/2020 | Song | H01M 10/482 |
| 2020/0369161 | A1* | 11/2020 | Lee | B60K 16/00 |
| 2020/0381750 | A1* | 12/2020 | Pettit | H01M 10/46 |
| 2020/0391614 | A1* | 12/2020 | Maruno | B60L 53/11 |
| 2020/0392826 | A1* | 12/2020 | Cui | H02K 11/04 |
| 2021/0016678 | A1* | 1/2021 | Healy | B60L 50/16 |
| 2021/0046845 | A1* | 2/2021 | Healy | B60K 17/36 |
| 2021/0070138 | A1* | 3/2021 | Schumacher | H02J 7/34 |
| 2021/0078435 | A1 | 3/2021 | Van De Water | |
| 2021/0094437 | A1* | 4/2021 | Tsubokura | B60L 50/50 |
| 2021/0155100 | A1 | 5/2021 | Khaligh et al. | |
| 2021/0175721 | A1* | 6/2021 | Berry | H02J 7/0048 |
| 2021/0245616 | A1* | 8/2021 | Konishi | B60L 55/00 |
| 2021/0246774 | A1* | 8/2021 | Cui | H02K 11/049 |
| 2021/0273453 | A1* | 9/2021 | Nishio | B60L 50/50 |
| 2021/0281098 | A1* | 9/2021 | Ozaki | B60L 53/35 |
| 2021/0300203 | A1* | 9/2021 | Sakurai | H02J 3/322 |
| 2021/0302995 | A1* | 9/2021 | Hashizume | G05D 1/0268 |
| 2021/0310320 | A1* | 10/2021 | Fischer | F04B 17/06 |
| 2021/0331553 | A1* | 10/2021 | Healy | B60L 58/27 |
| 2022/0025723 | A1* | 1/2022 | Fischer | H02J 13/00036 |
| 2022/0038019 | A1* | 2/2022 | Gaona Rosanes | H02M 1/4258 |
| 2022/0126714 | A1* | 4/2022 | Bucknor | B60L 53/53 |
| 2022/0163591 | A1* | 5/2022 | Matthey | H01M 10/48 |
| 2022/0170332 | A1* | 6/2022 | Fischer | H02B 1/52 |
| 2022/0185115 | A1* | 6/2022 | Divekar | B60L 3/0092 |
| 2022/0356772 | A1* | 11/2022 | Fischer | F04B 17/03 |
| 2022/0363157 | A1* | 11/2022 | Nakagawa | B60W 60/0023 |
| 2022/0371449 | A1* | 11/2022 | Woodward | F03D 9/32 |
| 2022/0410728 | A1* | 12/2022 | Marquez | B60L 8/003 |
| 2023/0033226 | A1* | 2/2023 | Healy | B60H 1/20 |
| 2023/0059385 | A1* | 2/2023 | Healy | B60K 6/40 |
| 2023/0160271 | A1* | 5/2023 | Fischer | F04B 17/03 166/308.1 |
| 2023/0339351 | A1* | 10/2023 | Andreas | B60L 53/51 |

OTHER PUBLICATIONS

Notice of Allowance and Fees Due, dated Feb. 15, 2023, issued in U.S. Appl. No. 17/950,701; 8 pages.

* cited by examiner

MOBILE GENERATOR CHARGING SYSTEM AND METHOD

CROSS-REFERENCE TO RELATED APPLICATIONS

This application is a continuation of U.S. patent application Ser. No. 17/950,701 filed Sep. 22, 2022, entitled "Mobile Generator Charging System and Method," which claims priority under 35 U.S.C. § 119(e) to U.S. Patent Application No. 63/247,586, filed Sep. 23, 2021, entitled "Mobile Generator Charging System and Method," all of which are incorporated herein by reference.

BACKGROUND

Currently, in many situations and locations, it is difficult to charge an electric powered vehicle, device, or system because of a lack of power sources. The vehicle, device, or system may have to find or locate a power source but oftentimes this is not feasible for a number of reasons. As an example, the vehicle may be currently located in a remote location where there are no options. As another example, after a natural disaster such as a hurricane or tornado, there may be a long-term power outage and no available power source. It would be optimal to have a power source that is transportable and capable of traveling to a particular location or device.

It is with these issues in mind, among others, that various aspects of the disclosure were conceived.

SUMMARY

According to one aspect, a mobile generator charging system and method is provided that is transportable and capable of traveling from one location to a second location associated with a vehicle, aircraft, watercraft, building, or other object to be powered. The system may have a first charger that may be connected to an aircraft, vehicle, watercraft, building, or other object having at least one battery and a second charger connected to an on board battery pack as well as one or more PLCs that manage communication between the aircraft, vehicle, watercraft, building, or other object and the on board battery pack to ensure that the at least one battery reaches a preset state of charge (SOC) and the on board battery pack reaches the preset SOC. In one example, the mobile generator charging system may be located on or within a trailer such as a forty-eight foot trailer that may be transported via road, rail, boat, or air.

In one example, a system may include a first charger connected to one of an aircraft, a watercraft, and a vehicle having at least one vehicle battery, a second charger connected to an on board battery pack, and at least one programmable logic controller (PLC) to manage communication between the at least one vehicle battery and the first charger to ensure that the at least one vehicle battery reaches a preset state of charge (SOC), manage communication between the on board battery pack and the second charger to ensure that the on board battery pack reaches the preset SOC, and manage transfer of energy from the on board battery pack to the at least one vehicle battery.

In another example, a method may include managing, by at least one programmable logic controller (PLC), communication between one of a vehicle, a watercraft, and an aircraft, a first charger, and a second charger, managing, by the at least one PLC, at least one power source to provide energy to the first charger and the second charger, ensuring, by the at least one PLC, that the first charger provides the at least one battery associated with the vehicle, the watercraft, or the aircraft with a preset state of charge (SOC), ensuring, by the at least one PLC, that the second charger provides the on board battery pack with the preset SOC, and initiating a connection, by the at least one PLC to allow transfer of energy from the on board battery pack to the at least one battery associated with the vehicle, the watercraft, or aircraft.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
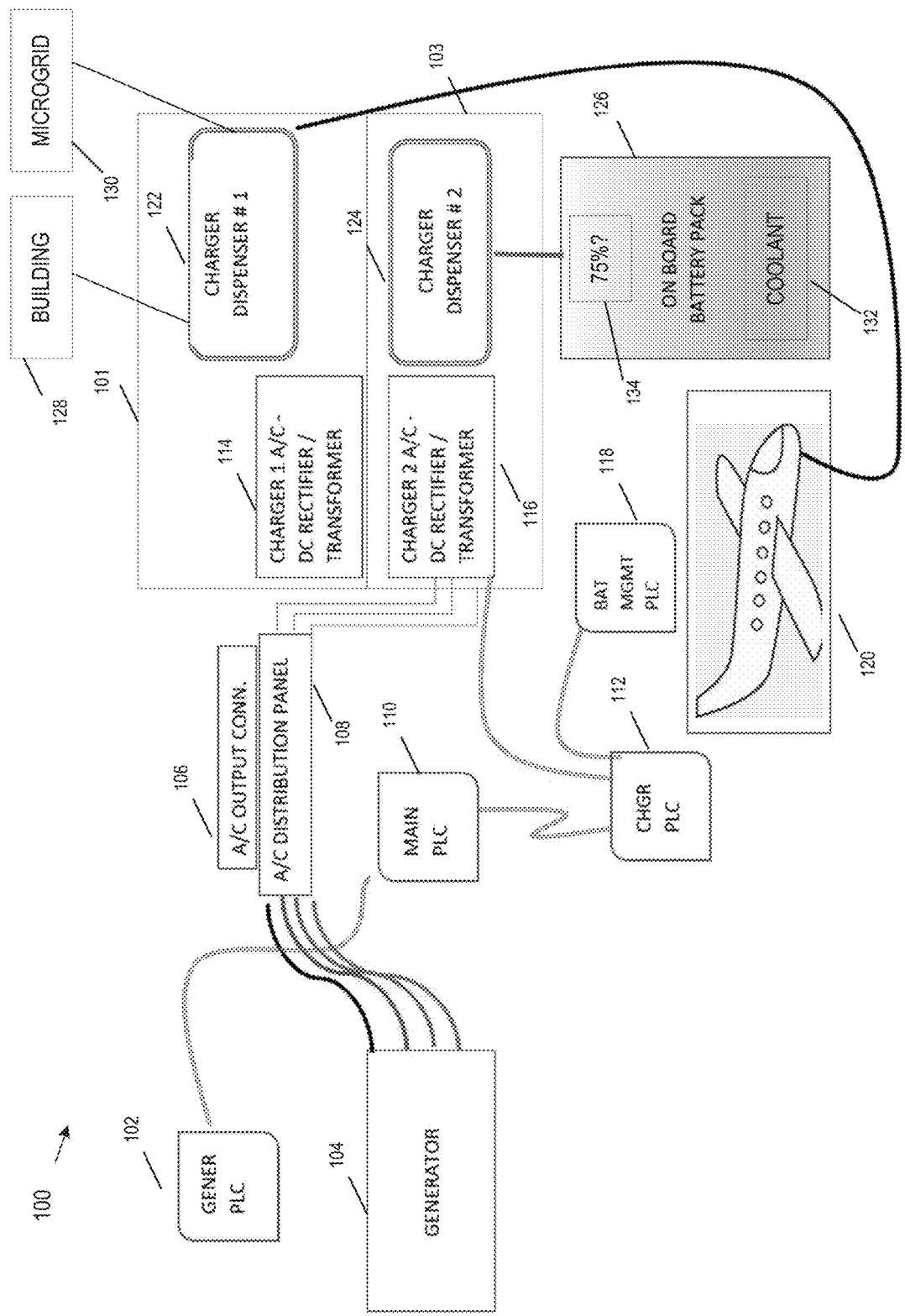
FIG. 1 is a block diagram of a mobile generator charging system according to an example of the instant disclosure.

Aspects of a system and method for mobile generator charging includes managing, by at least one programmable logic controller (PLC), communication between a vehicle, a watercraft, or an aircraft, a first charger, and a second charger, managing, by the at least one PLC, at least one power source to provide energy to the first charger and the second charger, ensuring, by the at least one PLC, that the first charger provides the at least one battery associated with the vehicle, the watercraft, or the aircraft with a preset state of charge (SOC), ensuring, by the at least one PLC, that the second charger provides the on board battery pack with the preset SOC, and initiating a connection, by the at least one PLC to allow transfer of energy from the on board battery pack to the at least one battery associated with the vehicle, the watercraft, or aircraft.

The mobile generator charging system may be contained or stored in a trailer such as a forty-eight foot trailer to be transported to a particular location such as a particular location associated with the vehicle (e.g., a parking location), watercraft (e.g., a dock), or aircraft (e.g., an airport or heliport). The system may include a number of programmable logic controllers (PLCs) that may manage one or more components and share data associated with each component with a main PLC and transmit the data to a remote location and/or at least one remote computing device.

As an example, a generator PLC may manage engine performance and generator output to ensure a smooth and consistent voltage output to be delivered to an A/C distribution panel. The A/C distribution panel may have thermal and remote switch actuators such that the generator PLC may have control of A/C power switching in the A/C distribution panel. An A/C output connector may allow connection of the system to another electrical panel to be powered by the system such as a building, lift station, compressed natural gas (CNG) station, or others. A charger PLC may manage communication between a vehicle and a charger.

A vehicle battery management system (BMS) may report battery state of charge (SOC), temperature, rate of change in temperature, and other data to the charger PLC. The charger PLC may adjust the power level being delivered to the vehicle battery using the data from the BMS. The change in power level may be reported to the main PLC that may communicate the change to a PLC located in a second charger to begin charging an on board battery pack to absorb energy not being used by a first charger. The on board battery pack may be sized as a minimum to have a same capacity as one or more vehicle batteries to deliver energy and charge the one or more vehicle batteries. The system may include a cooling system for the on board battery pack. The process may continue until a vehicle battery attains a preset SOC. At this time, the first charger may discontinue a charge session and generator output may be provided to the second charger and the on board battery pack. When the second charger slows to where it is drawing less than a preset amount of generator output, the main PLC may trigger the second charger to discontinue the charging session. This may open a circuit in the distribution panel to stop a flow of electricity to the first charger and the second charger, the generator may cease to output power, and may shut down.

At a beginning of a next charge session, when the first charger is plugged into a vehicle, the one or more PLCs may initiate a connection between the vehicle battery and the on board battery pack. The connection may allow transfer of energy from the on board battery pack to the vehicle that may be monitored by the charger PLC and the main PLC. When the transfer of energy slows indicating the batteries are close to a same SOC, the main PLC may start the generator, close the breaker in the distribution panel, and start the session on the first charger.

The fuel system on the system may be sized to accommodate at least twelve hours of operation. There may be a refueling system located on site to fuel the system using compressed natural gas (CNG) as a fuel, as well as renewable natural gas (RNG), ethanol, and others. In other words, the system may use fuels that have a zero or negative carbon index. As a result, the system may have a carbon credit value.

The generator may be sized to operate at 75% capacity under a full charging load. The one or more PLCs associated with the system may monitor an engine associated with the generator, electric output, the first charger and the second charger, a vehicle battery, the on board battery pack, and functions associated with each. The one or more PLCs may redirect charging from the vehicle to the on board battery pack to maintain a generator output at optimal until the vehicle is fully charged. When the charger charging the on board battery pack reduces output below 75% of the generator output, the one or more PLCs may shut down the system.

The first charger and the second charger may use power management to increase energy flow from the on board battery pack as a vehicle state of charge increases to maintain a consistent draw on the generator. The one or more PLCs may monitor the state of charge, temperature, and current flow to the vehicle battery and the on board battery pack as well as the current flow to each charger. The one or more PLCs may adjust flow of coolant to the on board battery pack and the vehicle battery to manage heat in the vehicle battery and the on board battery pack to maximize a speed of charge. As a result, the system may provide a mobile energy source with a charger that can travel to the vehicle to charge the vehicle battery and the system may fit on or in a trailer among other containers that may be transported via a vehicle, rail, boat, or aircraft. In addition, the system may utilize a variety of renewable low carbon intensity fuels to generate electricity for the vehicle.

FIG. 1 illustrates a block diagram of a mobile generator charging system 100 according to an example embodiment. The mobile generator charging system may include a generator programmable logic controller (PLC) 102 or a generator computing device, a power source, e.g., a generator 104, an A/C output connector 106, an A/C distribution panel 108, a main PLC 110 or main computing device, a charger PLC 112 or a charger computing device, a first charger A/C-D/C rectifier/transformer 114, a second charger A/C-D/C rectifier/transformer 116, a battery management PLC 118 or a battery management computing device, an aircraft, vehicle, or watercraft 120, a first charger dispenser 122, a second charger dispenser 124, and an on board battery pack 126.

A first charger 101 may include the first charger dispenser 122 and the first charger A/C-D/C rectifier/transformer 114 among other components. A second charger 103 may include the second charger dispenser 124 and the second charger A/C-D/C rectifier/transformer 116 among other components.

When a charger connection is made with the aircraft 120, the charger PLC 112 and the battery management PLC 118 may communicate regarding temperature and voltage state of charge. The main PLC 110 may close the connection with the on board battery pack 126 allowing the balance of the vehicle battery and the on board battery pack 126. Current flow may slow to a preset limit through the cable connecting the first charger 101. The main PLC 110 may queue the generator PLC 102 to start the generator 104. When the generator 104 provides appropriate power conditions (RPMs), the contactor in the generator 104 may close and energize the A/C distribution panel 108 and the first charger 101.

Communication may continue between the BMS on the aircraft 120 and the charger PLC 112 to control the charge. When the BMS requests the charging rate to be reduced, the main PLC 110 may energize the second charger 103 at a rate to manage the load on the generator 104 to maintain 75% of design. When the battery of the aircraft 120 reaches the preset (90%) state of charge, the first charger 101 may discontinue and the second charger 103 may go to 100%. When the BMS on the on board battery pack 126 slows the charge to below 75% of generator capacity 134, the main PLC 110 may shut down the generator 104. The on board battery pack 126 may act as house batteries to keep the system functional. At least one of the generator PLC 102, the main PLC 110, the charger PLC, and the battery management PLC 118 may adjust flow of coolant 132 to the on board battery pack 126 and the vehicle battery to manage heat in the vehicle battery and the on board battery pack 126 to maximize a speed of charge.

The at least one generator PLC 102, the charger PLC 112, the main PLC 110, and the battery management PLC 118 may be configured to receive data from and/or transmit data to one another through a communication network. Although each PLC is shown as a single computing device, it is contemplated each PLC may include multiple computing devices or multiple PLCs.

The communication network can be the Internet, an intranet, or another wired or wireless communication network. For example, the communication network may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

Each PLC may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, each PLC further includes at least one communications interface to transmit and receive communications, messages, and/or signals.

Each PLC could be a programmable logic controller, a programmable controller, a laptop computer, a smartphone, a personal digital assistant, a tablet computer, a standard personal computer, or another processing device. Each PLC may include a display, such as a computer monitor, for displaying data and/or graphical user interfaces. The system may also include a Global Positioning System (GPS) hardware device for determining a particular location, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

As an example, the system 100 may include a first charger 101 connected to one of an aircraft, a watercraft, and a vehicle 120 having at least one vehicle battery, a second charger 103 connected to an on board battery pack 126 and at least one PLC to manage communication between the at least one vehicle battery and the first charger 101 to ensure that the at least one vehicle battery reaches a preset SOC with no harm to the at least one vehicle battery, manage communication between the on board battery pack 126 and the second charger 103 to ensure that the on board battery pack 126 reaches the preset SOC with no harm to the on board battery pack, and manage transfer of energy from the on board battery pack 126 to the at least one vehicle battery.

As an example, the at least one PLC may include a main PLC 110, a charger PLC 112, a battery management PLC 118, and a generator PLC 102. The charger PLC 112 may manage the first charger 101 and the second charger 103, the battery management PLC 118 may manage the at least one vehicle battery and the on board battery pack 126, the generator PLC 102 may manage the generator 104, and the main PLC 110 may manage the charger PLC 112, the battery management PLC 118, and the generator PLC 102.

As an example, the generator 104 can be any device that may provide energy to the first charger 101 and the second charger 103. Additionally, the system 100 may include an output A/C connector 106 and an A/C distribution panel 108, a first charger A/C-D/C rectifier transformer 114, and a second charger A/C-D/C rectifier transformer 116. The system 100 may include a trailer or other storage container to house the system. The trailer may be a mobile trailer such as a forty-eight foot trailer that may be pulled by a vehicle such as a pickup truck or a tractor unit such as a semi-tractor truck. The mobile trailer may have a different length such as twenty-eight feet, thirty-two feet, thirty-four feet, forty feet, forty-five feet, forty-eight feet, and fifty-three feet, among others. The trailer may be thirteen feet, six inches high or a different height and one-hundred and two inches wide or a different width. The system may further include a fuel system having one or more fuel tanks utilizing at least one of compressed natural gas, renewable natural gas, and ethanol, among other renewable low carbon fuels. The system can provide power to an electrical panel such as one located in a building, a lift station, a CNG station, or a microgrid, among others. As is known, a microgrid may be a localized energy grid that may be separate from the traditional power grid and it may operate autonomously. The microgrid may provide utility grade power.

Figure 2:
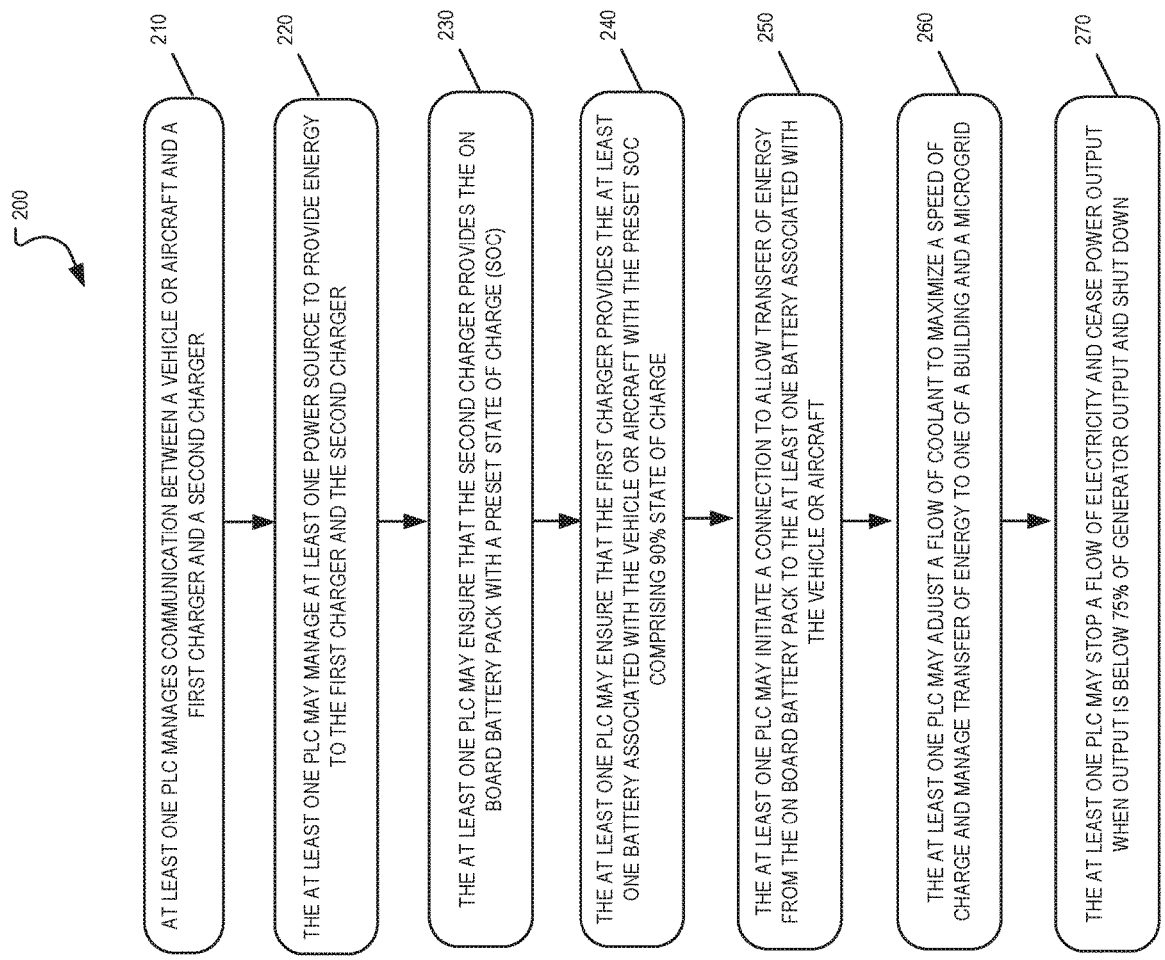
FIG. 2 is a flowchart of a method for allowing transfer of energy by the mobile generator charging system according to an example of the instant disclosure.

FIG. 2 illustrates an example method 200 for allowing transfer of energy from the on board battery pack to the at least one battery associated with the vehicle 120. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method 200 includes managing communication by the at least one PLC between the vehicle 120 and a first charger 101 and a second charger 103 at block 210. The at least one PLC may include a main PLC 110, a charger PLC 112, a battery management PLC 118, and a generator PLC 102. The charger PLC 112 can manage the first charger 101 and the second charger 103, the battery management PLC 118 manages the at least one vehicle battery and the on board battery pack 126, the generator PLC 102 manages the generator 104, and the main PLC 110 manages the charger PLC 112, the battery management PLC 118, and the generator PLC 102.

According to some examples, the method 200 includes managing by the at least one PLC the at least one power source to provide energy to the first charger 101 and the second charger 103 at block 220.

According to some examples, the method 200 includes ensuring by the at least one PLC that the second charger 103 provides the on board battery pack 126 with the preset state of charge at block 230.

According to some examples, the method 200 includes ensuring by the at least one PLC that the first charger 101 provides the at least one battery associated with the vehicle 120 with the preset state of charge comprising 90% state of charge at block 240.

According to some examples, the method 200 includes initiating a connection by the at least one PLC to allow transfer of energy from the on board battery pack 126 to the at least one battery associated with the vehicle 120 at block 250.

According to some examples, the method 200 includes adjusting a flow of coolant to maximize a speed of charge and managing transfer of energy to one of a building and a microgrid at block 260.

According to some examples, the method 200 includes stopping a flow of electricity and ceasing power output when output is below 75% of generator output and shutting down the system at block 270.

According to some examples, the method 200 includes providing energy to the first charger 101 and the second charger 103 using a power source.

According to some examples, the method 200 may include providing the transfer of energy to another electrical panel using an output A/C connector 106 and an A/C distribution panel 108.

As an example, the first charger 101 can be a first charger A/C-D/C rectifier transformer 114 and the second charger 103 may be a second charger A/C-D/C rectifier transformer 116.

According to some examples, the method 200 may include housing the at least one PLC, the first charger 101, and the second charger 103 in one of a trailer and a container. The trailer can be a mobile trailer.

According to some examples, the method 200 may include utilizing a fuel system including at least one of compressed natural gas, renewable natural gas, and ethanol.

According to some examples, the method 200 may include providing power to an electrical panel.

According to some examples, the method 200 may include providing power to one of a building and a microgrid.

Figure 3:
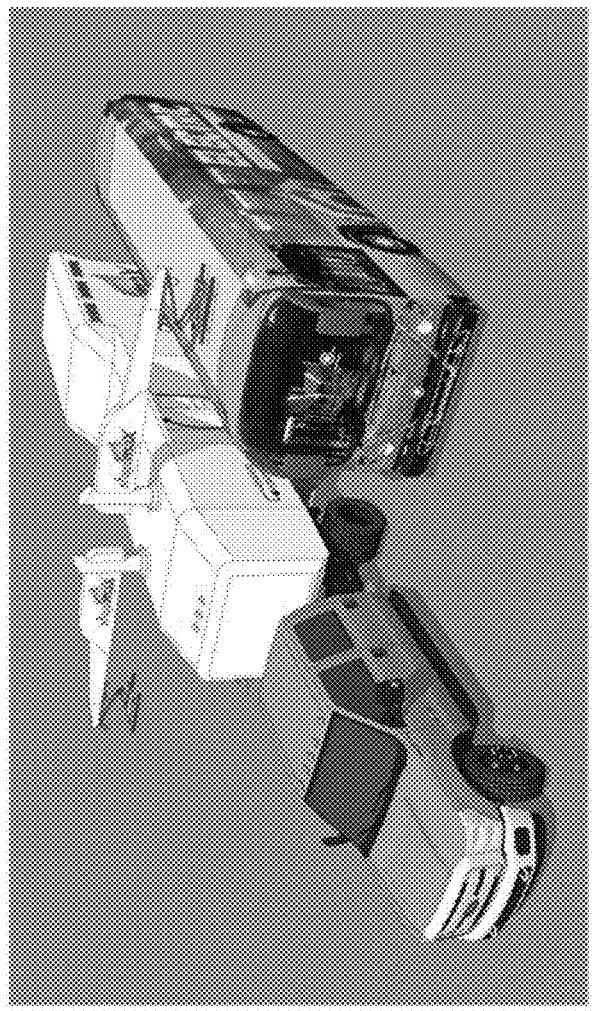
FIGS. 3 and 4A show schematic drawings of the mobile generator charging system according to an example of the instant disclosure.
Figure 4A:
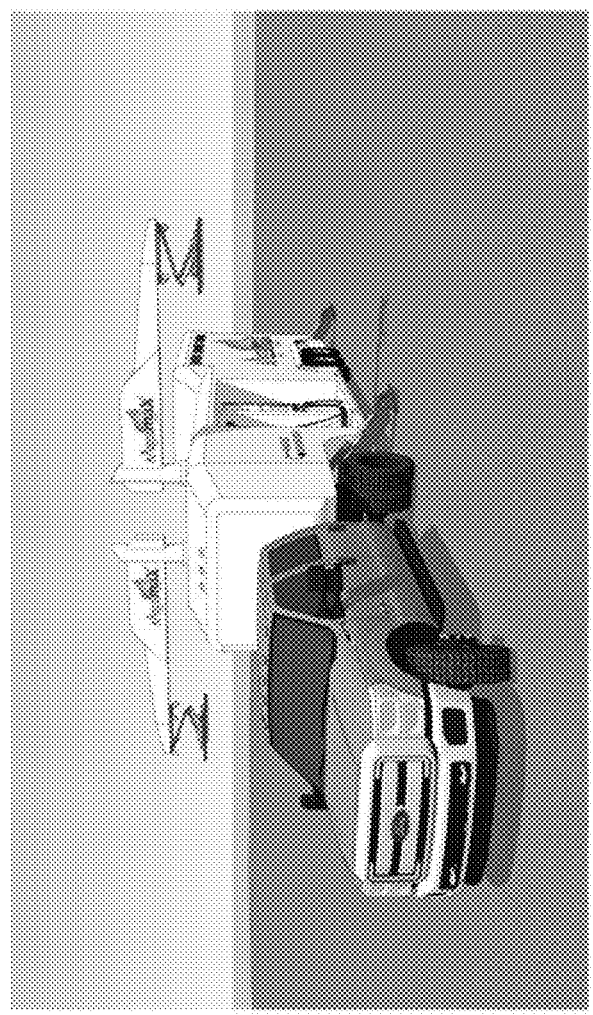

FIGS. 3 and 4A show schematic drawings of the mobile generator charging system 100 according to an example of the instant disclosure. As shown in FIG. 3, the system 100 may be housed in a trailer that may be transported by a vehicle such as a pickup truck. Alternatively, the trailer may be transported via rail, boat, or air. The system 100 is shown as providing energy to an electric vehicle. In one example, the vehicle may be a bus. FIG. 4 shows a different schematic view of the trailer being transported by the vehicle.

Figure 4B:
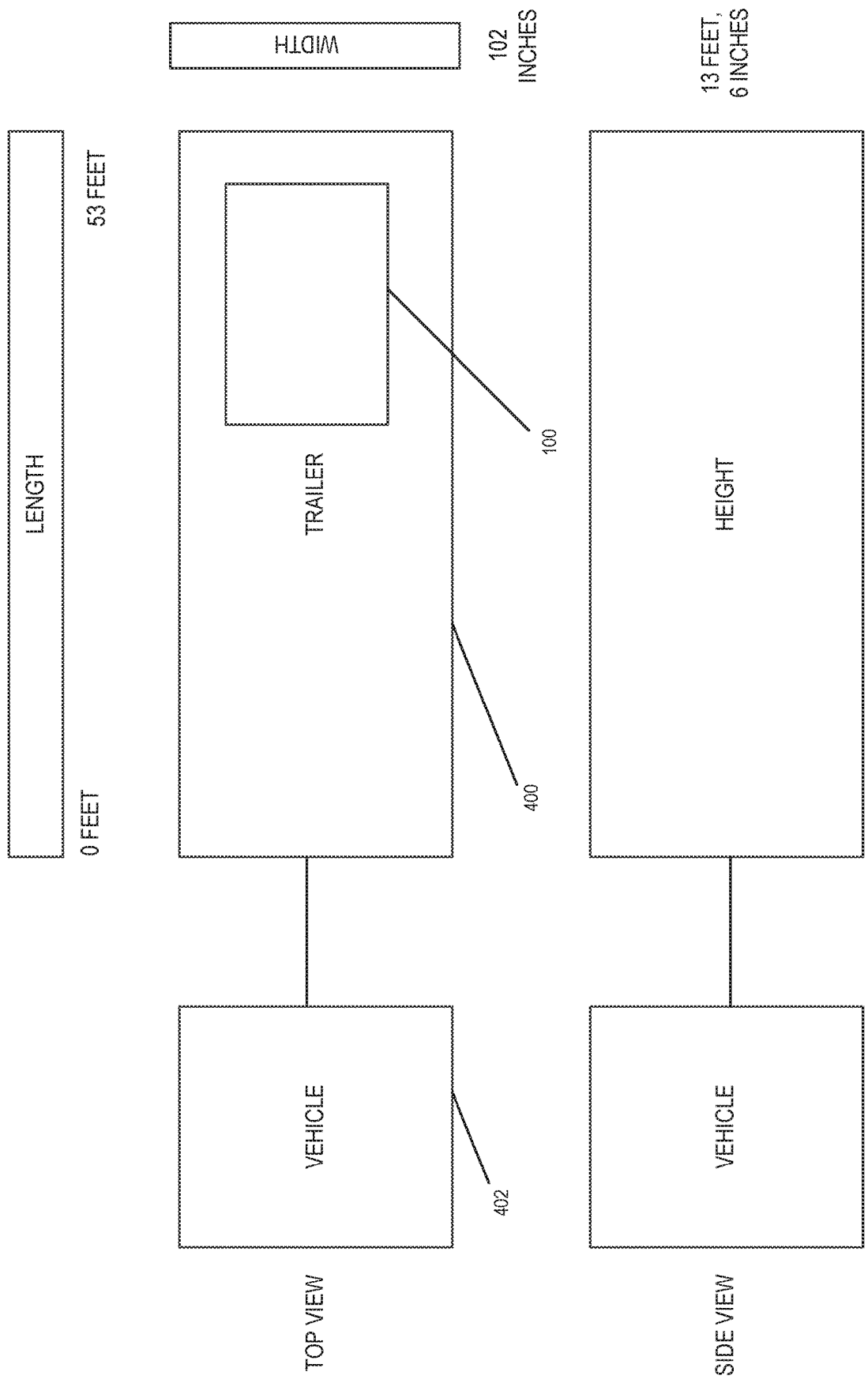
FIG. 4B shows a vehicle with a trailer housing the mobile generator charging system according to an example of the instant disclosure.

FIG. 4B shows a vehicle 402 with a trailer 400 housing the mobile generator charging system 100 according to an example of the instant disclosure. The trailer 400 may be a mobile trailer such as a forty-eight foot trailer that may be pulled by a vehicle such as a pickup truck or a tractor unit such as a semi-tractor truck. The mobile trailer may have a different length such as twenty-eight feet, thirty-two feet, thirty-four feet, forty feet, forty-five feet, forty-eight feet, and fifty-three feet, among others. The trailer 400 may be thirteen feet, six inches high or a different height and one-hundred and two inches wide or a different width.

Figure 5:
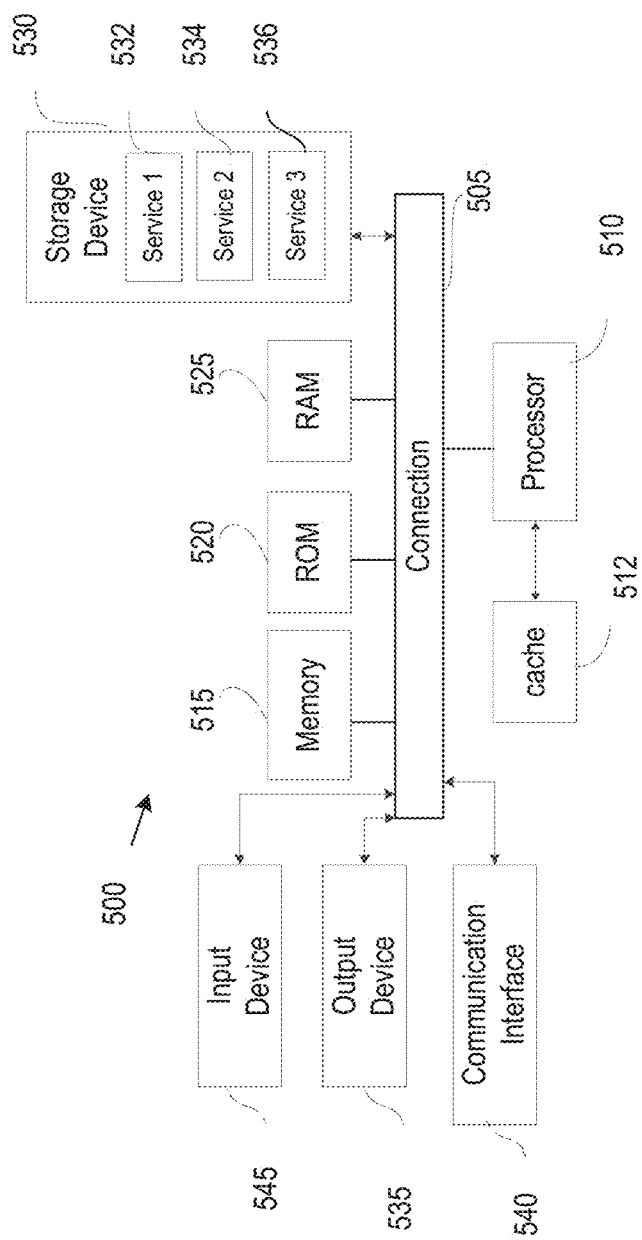
FIG. 5 shows an example of a system for implementing certain aspects of the present technology.

FIG. 5 shows an example of computing system 500, which can be for example any computing device making up the generator PLC 102, the main PLC 110, the charger PLC 112, and the battery management PLC 118, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a first charger connected to one of an aircraft, a watercraft, and a vehicle having at least one vehicle battery, a second charger connected to an on board battery pack, and at least one programmable logic controller (PLC) to: manage communication between the at least one vehicle battery and the first charger to ensure that the at least one vehicle battery reaches a preset state of charge (SOC), manage communication between the on board battery pack and the second charger to ensure that the on board battery pack reaches the preset SOC, and manage transfer of energy from the on board battery pack to the at least one vehicle battery.

Aspect 2: The system of Aspect 1 wherein the at least one PLC comprises a main PLC, a charger PLC, a battery management PLC, and a generator PLC.

Aspect 3: The system of Aspects 1 and 2, wherein the charger PLC manages the first charger and the second charger, the battery management PLC manages the at least one vehicle battery and the on board battery pack, the generator PLC manages a generator, and the main PLC manages the charger PLC, the battery management PLC, and the generator PLC.

Aspect 4: The system of any of Aspects 1 to 3, further comprising a power source to provide energy to the first charger and the second charger.

Aspect 5: The system of any of Aspects 1 to 4 further comprising an output A/C connector and an A/C distribution panel.

Aspect 6: The system of any of Aspects 1 to 5, further comprising a first charger A/C-D/C rectifier transformer and a second charger A/C-D/C rectifier transformer.

Aspect 7: The system of any of Aspects 1 to 6, further comprising one of a trailer and a container to house the system.

Aspect 8: The system of any of Aspects 1 to 7 wherein the trailer is a mobile trailer.

Aspect 9: The system of any of Aspects 1 to 8, further comprising a fuel system utilizing at least one of compressed natural gas, renewable natural gas, and ethanol.

Aspect 10: The system of any of Aspects 1 to 9, wherein the system provides power to an electrical panel.

Aspect 11: The system of any of Aspects 1 to 10, wherein the system provides power to one of a building and a microgrid.

Aspect 12: A method, comprising: managing, by at least one programmable logic controller (PLC), communication between a vehicle, a watercraft, or an aircraft, a first charger, and a second charger, managing, by the at least one PLC, at least one power source to provide energy to the first charger and the second charger, ensuring, by the at least one PLC, that the first charger provides the at least one battery associated with the vehicle, the watercraft, or the aircraft with a preset state of charge (SOC), ensuring, by the at least one PLC, that the second charger provides the on board battery pack with the preset SOC, and initiating a connection, by the at least one PLC to allow transfer of energy from the on board battery pack to the at least one battery associated with the vehicle, the watercraft, or aircraft.

Aspect 13: The method of Aspect 12, wherein the at least one PLC comprises a main PLC, a charger PLC, a battery management PLC, and a generator PLC.

Aspect 14: The method of Aspects 12 and 13, wherein the charger PLC manages the first charger and the second charger, the battery management PLC manages the at least one vehicle battery and the on board battery pack, the generator PLC manages a generator, and the main PLC manages the charger PLC, the battery management PLC, and the generator PLC.

Aspect 15: The method of any of Aspects 12 to 14, further comprising providing energy to the first charger and the second charger using a power source.

Aspect 16: The method of any of Aspects 12 to 15, further comprising providing the transfer of energy to another electrical panel using an output A/C connector and an A/C distribution panel.

Aspect 17: The method of any of Aspects 12 to 16, wherein the first charger comprises a first charger A/C-D/C rectifier transformer and the second charger comprises a second charger A/C-D/C rectifier transformer.

Aspect 18: The method of any of Aspects 12 to 17, further comprising housing the at least one PLC, the first charger, and the second charger in one of a trailer and a container.

Aspect 19: The method of any of Aspects 12 to 18, wherein the trailer is a mobile trailer.

Aspect 20: The method of any of Aspects 12 to 19, further comprising utilizing a fuel system comprising at least one of compressed natural gas, renewable natural gas, and ethanol.

Aspect 21: The method of any of Aspects 12 to 20, further comprising providing power to an electrical panel.

Aspect 22: The method of any of Aspects 12 to 21, further comprising providing power to one of a building and a microgrid.

What is claimed is:

1. A system comprising:
a first charger connected to another device external from the system having at least one battery;
a second charger connected to an on board battery pack; and
at least one programmable logic controller (PLC) configured to:
manage communication between the at least one battery and the first charger to ensure that the at least one battery reaches a preset state of charge (SOC) comprising 90% state of charge;
manage communication between the on board battery pack and the second charger to ensure that the on board battery pack reaches the preset SOC and trigger the second charger to discontinue the charging session;
manage transfer of energy from the on board battery pack to the at least one battery;
adjust a flow of coolant to the at least one battery associated with the another device to maximize a speed of charge, adjust a flow of coolant to the on board battery pack to maximize the speed of charge, and manage transfer of energy from the on board battery pack to one of a building and a microgrid; and
stop a flow of electricity to the first charger and the second charger, cease output of power when output is below 75% of generator output, and shut down the system.

2. The system of claim 1, further comprising a refueling system configured to provide fuel to the system using at least one of compressed natural gas (CNG), renewable natural gas (RNG), and ethanol.

3. The system of claim 1, wherein the system is housed in one of a trailer and a container to be transported via one of a vehicle, rail, boat, and aircraft.

4. The system of claim 1, further comprising a battery management system (BMS) configured to report a battery state of charge, temperature, and a rate of change in temperature.

5. The system of claim 1, wherein the device external to the system comprises one of an aircraft, a watercraft, and a vehicle.

6. The system of claim 1, wherein the at least one battery comprises an aircraft battery.

7. The system of claim 1, wherein the at least one battery comprises a watercraft battery.

8. The system of claim 1, wherein the at least one battery comprises a vehicle battery.

9. The system of claim 1, wherein the first charger is connected to an electric vehicle.

10. The system of claim 9, wherein the electric vehicle comprises an electric bus.

11. The system of claim 1, wherein the system is housed in a trailer comprising a mobile trailer to be pulled by a vehicle comprising one of a pickup truck and a semi-tractor truck.

12. The system of claim 11, wherein the mobile trailer has a length comprising one of twenty-eight feet, thirty-two feet, thirty-four feet, forty feet, forty-five feet, forty-eight feet, and fifty-three feet.

13. The system of claim 12, wherein the mobile trailer has a height of thirteen feet, six inches.

14. The system of claim 13, wherein the mobile trailer has a width of one-hundred and two inches.

15. A method, comprising:
managing, by at least one programmable logic controller (PLC), communication between an external device, a first charger, and a second charger, the external device external from the first charger and the second charger;
managing, by the at least one PLC, at least one power source to provide energy to the first charger and the second charger;
ensuring, by the at least one PLC, that the first charger provides the at least one battery associated with the external device with a preset state of charge (SOC) comprising 90% state of charge;
ensuring, by the at least one PLC, that the second charger provides the on board battery pack with the preset SOC, and triggering the second charger to discontinue the charging session;
initiating a connection, by the at least one PLC, to allow transfer of energy from the on board battery pack to the at least one battery associated with the external device;
adjusting a flow of coolant to the at least one battery associated with the external device to maximize a speed of charge, adjusting a flow of coolant to the on board battery pack to maximize the speed of charge, and managing transfer of energy from the on board battery pack to one of a building and a microgrid; and
stopping a flow of electricity to the first charger and the second charger, ceasing output of power when output is below 75% of generator output, and shutting down the system.

16. A portable system comprising a container to house the system comprising:
a first charger connected to another device external from the system having at least one battery;
a second charger connected to an on board battery pack; and
at least one programmable logic controller (PLC) configured to:
manage communication between the at least one battery and the first charger to ensure that the at least one battery reaches a preset state of charge (SOC) comprising 90% state of charge;
manage communication between the on board battery pack and the second charger to ensure that the on board battery pack reaches the preset SOC and trigger the second charger to discontinue the charging session;
manage transfer of energy from the on board battery pack to the at least one battery;
adjust a flow of coolant to the at least one battery associated with the external device to maximize a speed of charge, adjust a flow of coolant to the on board battery pack to maximize the speed of charge, and manage transfer of energy from the on board battery pack to one of a building and a microgrid; and
stop a flow of electricity to the first charger and the second charger, cease output of power when output is below 75% of generator output, and shut down the system.

* * * * *